US012488797B2

(12) United States Patent
Khan Khattak et al.

(10) Patent No.: US 12,488,797 B2
(45) Date of Patent: Dec. 2, 2025

(54) SYSTEMS AND METHODS FOR EXTRACTING INFORMATION FROM A DIALOGUE

(71) Applicants: THE GOVERNING COUNCIL OF THE UNIVERSITY OF TORONTO, Toronto (CA); UNITY HEALTH TORONTO, Toronto (CA)

(72) Inventors: Faiza Khan Khattak, Etobicoke (CA); Frank Rudzicz, Toronto (CA); Muhammad Mamdani, Toronto (CA); Noah Crampton, Toronto (CA); Serena Jeblee, Toronto (CA)

(73) Assignees: THE GOVERNING COUNCIL OF THE UNIVERSITY OF TORONTO, Toronto (CA); UNITY HEALTH TORONTO, Toronto (CA)

( * ) Notice: Subject to any disclaimer, the term of this patent is extended or adjusted under 35 U.S.C. 154(b) by 933 days.

(21) Appl. No.: 17/675,189

(22) Filed: Feb. 18, 2022

(65) Prior Publication Data
US 2022/0172725 A1 Jun. 2, 2022

Related U.S. Application Data

(63) Continuation of application No. PCT/CA2020/051144, filed on Aug. 21, 2020.
(Continued)

(51) Int. Cl.
*G10L 15/26* (2006.01)
*G06F 40/284* (2020.01)
(Continued)

(52) U.S. Cl.
CPC ............ *G10L 15/26* (2013.01); *G06F 40/284* (2020.01); *G06N 20/00* (2019.01); *G10L 15/16* (2013.01);
(Continued)

(58) Field of Classification Search
None
See application file for complete search history.

(56) References Cited

U.S. PATENT DOCUMENTS 8,880,406 B2   11/2014   Santos-Lang et al.
9,514,130 B2   12/2016   Waibel
(Continued)

FOREIGN PATENT DOCUMENTS

CA   2856966 C      7/2017
CN   104485105 B    4/2018

OTHER PUBLICATIONS

International Preliminary Report on Patentability, Canadian Intellectual Property Office, international filing: Aug. 21, 2020, report issued: Feb. 17, 2022.
(Continued)

*Primary Examiner* — Nafiz E Hoque
(74) *Attorney, Agent, or Firm* — Bhole IP Law; Marc Lampert

(57) ABSTRACT

Described herein are systems and methods of extracting information from a dialogue, the dialogue having transcription data associated therewith. In an embodiment, the method including: receiving the transcription data associated with the dialogue; classifying utterances in the transcription data using a trained classification machine learning model, the classification machine learning model trained using one or more corpora of historical data comprising previous dialogues labelled with utterance types; identifying entities in the transcription data; classifying attributes in the transcription data using a trained attribute machine learning model, the attribute machine learning model trained using one or more corpora of historical data comprising previous dialogues labelled with attributes; and outputting at least one of the utterances, the entities, and the attributes.

18 Claims, 8 Drawing Sheets

Related U.S. Application Data

(60) Provisional application No. 62/890,432, filed on Aug. 22, 2019.

(51) Int. Cl.
| | | |
|---|---|---|
| *G06N 20/00* | (2019.01) | |
| *G10L 15/16* | (2006.01) | |
| *G10L 15/18* | (2013.01) | |
| *G10L 15/183* | (2013.01) | |
| *G16H 10/60* | (2018.01) | |
| *G10L 15/08* | (2006.01) | |

(52) U.S. Cl.
CPC ........ *G10L 15/1822* (2013.01); *G10L 15/183* (2013.01); *G16H 10/60* (2018.01); *G10L 2015/088* (2013.01)

(56) References Cited

U.S. PATENT DOCUMENTS

| | | |
|---|---|---|
| 9,691,385 B2 | 6/2017 | Neubacher et al. |
| 9,824,691 B1 | 11/2017 | Montero et al. |
| 2009/0012816 A1 | 1/2009 | Cookson et al. |
| 2013/0275161 A1 | 10/2013 | Dutta et al. |
| 2016/0259859 A1* | 9/2016 | Sathish ............... G06F 16/9535 |
| 2017/0154052 A1* | 6/2017 | Hassanzadeh ........ G06F 16/215 |
| 2018/0018966 A1 | 1/2018 | Leonard |
| 2018/0089383 A1* | 3/2018 | Allen ..................... G16H 15/00 |
| 2018/0168516 A1 | 6/2018 | Pappada et al. |
| 2018/0336183 A1 | 11/2018 | Lee et al. |
| 2019/0121532 A1 | 4/2019 | Strader et al. |
| 2019/0122766 A1 | 4/2019 | Strader et al. |
| 2019/0206517 A1 | 7/2019 | Devarakonda et al. |
| 2020/0151260 A1* | 5/2020 | Hätty ..................... G06N 3/044 |

OTHER PUBLICATIONS

International Search Report for PCT/CA2020/051144, Canadian Intellectual Property Office, international filing: Aug. 21, 2020, completed: Nov. 19, 2020, mailed: Nov. 23, 2020.

Written Opinion of the International Searching Authority for PCT/CA2020/051144, Canadian Intellectual Property Office, international filing: Aug. 21, 2020, opinion completed: Nov. 20, 2020, mailed: Nov. 23, 2020.

Jeblee, Serena, et al., "Extracting relevant information from physician-patient dialogues for automated clinical note taking", Proceedings of the Tenth International Workshop on Health Text Mining and Information Analysis (LOUHI 2019). https://doi.org/10.18653/v1/d19-6209.

Khattak, Faiza Khan, et al., "Extracting Clinically Pertinent Information from Patient-Clinician Dialogues", Stud Health Technol Inform. Aug. 21, 2019;264:1512-1513. doi: 10.3233/SHTI190510. PMID: 31438207.

Supplementary European Search Report for European application No. 20853653.2, EPO, search completed: Jul. 28, 2023, effective date: Aug. 7, 2023.

* cited by examiner

SYSTEMS AND METHODS FOR EXTRACTING INFORMATION FROM A DIALOGUE

TECHNICAL FIELD

The following relates generally to audio processing and parsing; and is more specifically directed to systems and methods of extracting information from a dialogue.

BACKGROUND

Healthcare and the profession of medicine are undergoing numerous changes and stresses in modern times. The digitization of care through clinical and administrative documentation in electronic medical records (EMRs) has resulted in increasingly exigent demands on clinicians to focus on data entry in computers. This mandatory yet mostly unwanted addition of labor to clinicians' existing scope of practice has sometimes resulted in a crisis of clinician burnout. Clinicians suffering from burnout provide worse quality of care, are less productive, and result in frequent turnover of care. Furthermore, patients are experiencing care in which their clinician primarily engages with the computer instead of direct eye contact engagement and interaction with them, which are necessary to build therapeutic trust. Digitization approaches to generating EMRs generally generate only limited standardized data.

SUMMARY

In an aspect, there is provided a computer-implemented method of extracting information from a dialogue, the dialogue having transcription data associated therewith, the method comprising: receiving the transcription data associated with the dialogue; classifying utterances in the transcription data using a trained classification machine learning model, the classification machine learning model trained using one or more corpora of historical data comprising previous dialogues labelled with utterance types; identifying entities in the transcription data; classifying attributes in the transcription data using a trained attribute machine learning model, the attribute machine learning model trained using one or more corpora of historical data comprising previous dialogues labelled with attributes; and outputting at least one of the utterances, the entities, and the attributes.

In a particular case of the method, the dialogue comprises a dialogue record of one or more persons and transcribed into the transcription data using an audio to text transcriber model trained using a transcription dataset.

In another case of the method, the method further comprising preprocessing the transcription data by one of stemming, lemmatization, part-of-speech tagging, and dependency parsing.

In yet another case of the method, the method further comprising preprocessing the transcription data by tokenizing and removing stop-words and frequent-words.

In yet another case of the method, classifying the utterances comprising classifying as one of a question utterance, a statement utterance, a positive answer utterance, a negative answer utterance, a backchannel utterance, and an excluded utterance.

In yet another case of the method, the classification machine learning model comprises a two-layer bidirectional gated recurrent unit (GRU) neural network.

In yet another case of the method, a first layer of the GRU network treats each utterance as a sequence of words and outputs a fixed-length utterance feature vector, and a second layer of the GRU network treats the dialogue as a sequence of the utterance feature vectors to generate a label for each utterance.

In yet another case of the method, identifying entities in the transcription data comprises identifying time expressions and converting the time expressions to standardized values using a temporal tagger.

In yet another case of the method, the classified attributes comprise modality and pertinence, modality comprising an indication of whether an event associated with the attribute occurred, pertinence comprising an indication of the relevance of the attribute.

In yet another case of the method, the information extracted from the dialogue comprises clinical information, and wherein the method further comprises: classifying one or more diagnoses in the transcription data using a trained diagnoses machine learning model; and outputting the diagnoses.

In another aspect, there is provided a system of extracting information from a dialogue, the dialogue having transcription data associated therewith, the system comprising one or more processors in communication with a data storage, the one or more processors configured to execute: a data acquisition module to receive the transcription data associated with the dialogue; an utterance module to classify utterances in the transcription data using a trained classification machine learning model, the classification machine learning model trained using one or more corpora of historical data comprising previous dialogues labelled with utterance types; an identifier module to identify entities in the transcription data; an attribute module to classify attributes in the transcription data using a trained attribute machine learning model, the attribute machine learning model trained using one or more corpora of historical data comprising previous dialogues labelled with attributes; and an output module to output at least one of the utterances, the entities, and the attributes.

In a particular case of the system, the dialogue comprises a dialogue record of one or more persons and transcribed into the transcription data using an audio to text transcriber model trained using a transcription dataset.

In another case of the system, the system further comprising a preprocessing module to preprocess the transcription data by one of stemming, lemmatization, part-of-speech tagging, and dependency parsing.

In yet another case of the system, the system further comprising a preprocessing module to preprocess the transcription data by tokenizing and removing stop-words and frequent-words.

In yet another case of the system, classifying the utterances comprising classifying as one of a question utterance, a statement utterance, a positive answer utterance, a negative answer utterance, a backchannel utterance, and an excluded utterance.

In yet another case of the system, the classification machine learning model comprises a two-layer bidirectional gated recurrent unit (GRU) neural network.

In yet another case of the system, a first layer of the GRU network treats each utterance as a sequence of words and outputs a fixed-length utterance feature vector, and a second layer of the GRU network treats the dialogue as a sequence of the utterance feature vectors to generate a label for each utterance.

In yet another case of the system, identifying entities in the transcription data comprises identifying time expressions and converting the time expressions to standardized values using a temporal tagger.

In yet another case of the system, the classified attributes comprise modality and pertinence, modality comprising an indication of whether an event associated with the attribute occurred, pertinence comprising an indication of the relevance of the attribute.

In yet another case of the system, the information extracted from the dialogue comprises clinical information, the system further comprising a dialogue module to classify one or more diagnoses in the transcription data using a trained diagnoses machine learning model, and the output module further outputs the diagnoses.

In yet another aspect, there is provided a computer-implemented method of extracting clinical information from textual data comprising a transcription of a patient-clinician dialogue, the method comprising: receiving the textual data; classifying utterances in the transcription data using a trained classification machine learning model, the classification machine learning model trained using one or more corpora of historical data comprising previous textual data labelled with utterances; identifying entities in the transcription data; classifying attributes in the transcription data using a trained attribute machine learning model, the attribute machine learning model trained using one or more corpora of historical data comprising previous textual data labelled with attributes; and outputting at least one of the utterances, the entities, and the attributes.

In a particular case of the method, classifying the utterances comprising classifying as one of a question utterance, a statement utterance, a positive answer utterance, a negative answer utterance, a backchannel utterance, and an excluded utterance.

In another case of the method, the classification machine learning model comprises a two-layer bidirectional gated recurrent unit (GRU) neural network.

In yet another case of the method, each utterance can be represented as a multi-dimensional vector using a word embedding model.

In yet another case of the method, a first layer of the GRU network treats each utterance as a sequence of words and outputs a fixed-length utterance feature vector, and a second layer of the GRU network treats the dialogue as a sequence of the utterance feature vectors to generate a label for each utterance.

In yet another case of the method, identifying entities in the transcription data comprises identifying time expressions and converting the time expressions to standardized values using a temporal tagger.

In yet another case of the method, identifying entities in the transcription data comprises identifying medical concepts using comparison to a medical lexicon.

In yet another case of the method, the classified attributes comprise modality and pertinence, modality comprising an indication of whether an event associated with the attribute occurred, pertinence comprising an indication of the relevance of the attribute to a medical condition.

In yet another case of the method, identifying entities further comprises classifying each entity as one of subjective (S), objective (O), assessment (A), or plan (P).

In yet another case of the method, the method further comprising classifying one or more diagnoses in the transcription data using a trained diagnoses machine learning model, and the output module further outputs the diagnoses.

In yet another case of the method, the method further comprising identifying a primary diagnosis from the one or more diagnoses.

In yet another case of the method, the method further comprising using topic modelling with an unsupervised model for extracting latent topics in the transcription of the dialogue.

In yet another case of the method, the method further comprising generating and outputting a natural language clinical note comprising at least one of the utterances, the entities, and the attributes.

In yet another case of the method, the generating the natural language clinical note comprises using a neural encoder-decoder model with copy and coverage mechanisms.

In yet another aspect, there is provided a system of extracting clinical information from textual data comprising a transcription of a patient-clinician dialogue, the system comprising one or more processors in communication with a data storage, the one or more processors configured to execute: a data acquisition module to receive the textual data; an utterance module to classify utterances in the transcription data using a trained classification machine learning model, the classification machine learning model trained using one or more corpora of historical data comprising previous textual data labelled with utterances; an identifier module to identify entities in the transcription data; an attribute module to classify attributes in the transcription data using a trained attribute machine learning model, the attribute machine learning model trained using one or more corpora of historical data comprising previous textual data labelled with attributes; and an output module to output at least one of the utterances, the entities, and the attributes.

In a particular case of the system, classifying the utterances comprising classifying as one of a question utterance, a statement utterance, a positive answer utterance, a negative answer utterance, a backchannel utterance, and an excluded utterance.

In another case of the system, the classification machine learning model comprises a two-layer bidirectional gated recurrent unit (GRU) neural network.

In yet another case of the system, each utterance can be represented as a multi-dimensional vector using a word embedding model.

In yet another case of the system, a first layer of the GRU network treats each utterance as a sequence of words and outputs a fixed-length utterance feature vector, and a second layer of the GRU network treats the dialogue as a sequence of the utterance feature vectors to generate a label for each utterance.

In yet another case of the system, identifying entities in the transcription data comprises identifying time expressions and converting the time expressions to standardized values using a temporal tagger.

In yet another case of the system, identifying entities in the transcription data comprises identifying medical concepts using comparison to a medical lexicon.

In yet another case of the system, the classified attributes comprise modality and pertinence, modality comprising an indication of whether an event associated with the attribute occurred, pertinence comprising an indication of the relevance of the attribute to a medical condition.

In yet another case of the system, identifying entities further comprises classifying each entity as one of subjective (S), objective (O), assessment (A), or plan (P).

In yet another case of the system, the system further comprising a dialogue module to classify one or more diagnoses in the transcription data using a trained diagnoses machine learning model, and the output module further outputs the diagnoses.

In yet another case of the system, the dialogue module further identifies a primary diagnosis from the one or more diagnoses.

In yet another case of the system, the system further comprising a dialogue module to use topic modelling with an unsupervised model for extracting latent topics in the transcription of the dialogue.

In yet another case of the system, the system further comprising a dialogue module to generate a natural language clinical note comprising at least one of the utterances, the entities, and the attributes.

In yet another case of the system, the generating the natural language clinical note comprises using a neural encoder-decoder model with copy and coverage mechanisms.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

A greater understanding of the embodiments will be had with reference to the Figures, in which.

DETAILED DESCRIPTION

Figure 1:
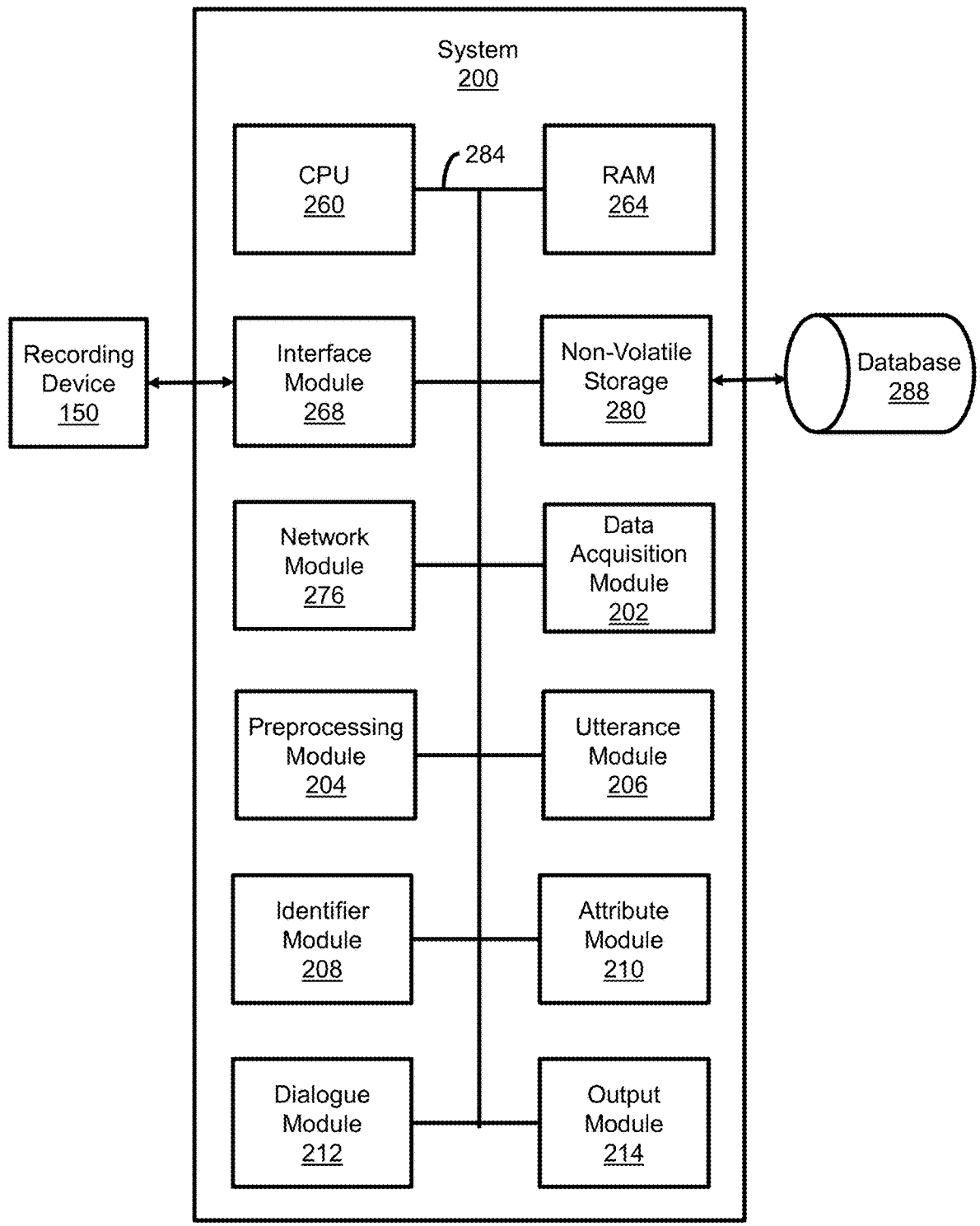
FIG. 1 shows of a system of extracting information from a dialogue, in accordance with an embodiment.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic discs, optical discs, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile discs (DVD) or other optical storage, magnetic cassettes, magnetic tape, magnetic disc storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

While the present disclosure generally describes an example implementation of the present embodiments on a patient-clinician dialogue, it is understood that the present embodiments can be applied to any suitable dialogue. Dialogue, as used herein, may be defined as any conversation or exchange, whether verbal or textual, between two or more entities. The dialogue can be between two or more persons, as recorded by the system, or can be a dialogue between a person and a computing device (for example, a computer, a smartphone, a tablet, a voice recorder, and the like). Therefore, dialogue, as used herein, can include a monologue or dictation directed to such computing device. While the present embodiments generally describe using a recording of a dialogue, it is understood that the present embodiments can be used with data comprising a textual transcription of the dialogue (for example, a conversation over text or a prior conversation that has since been transcribed into text).

Some implementations of the present embodiments may record and document any suitable dialogue; for example, an interview between an interviewer and interviewee, a consultation between a professional or consultant and a consultee, a survey or questionnaire between a questioner and questionee. In each case, an applicable lexicon-based term-matching can be used, in accordance with the present embodiments, to extract pertinent entities. Further, the present disclosure generally describes an example implementation of the present embodiments on a dialogue between two people, it is understood that the present embodiments can be applied to a dialogue with three or more people.

Some approaches record and document patient-clinician clinical encounter dialogues using lexicon-based term-matching to extract clinically pertinent entities. However, the linguistic context of these clinical entities is generally not included and related in the extraction, and the clinician generally must document these critical contextual elements themselves. The efficiency improvements of such approaches are therefore minimal at best. Additionally, there is limited flexibility in such approaches. For example, such approaches generally must be built for individual clinical specialties, and are typically built for specialties in which the clinical dialogue that occurs is routinely repeated. As these approaches do not contain complex parsing engineering to extract the relevant contextual information, the performance of such approaches at generating clinical documentation is only applicable for those limited settings in which certain key words or phrases are routinely repeated. Furthermore, given such shortcomings, such approaches struggle to accurately predict and thereby suggest correct modifications to the cumulative patient profile data elements in a patient chart after a clinical encounter. Nor can these approaches generally accurately predict correct selections of clinical and billing codes. In addition, such approaches are generally not flexible enough to enable a clinician to personally determine in advance how comprehensive they want the auto-generated documentation outputs to be.

In some other approaches, one or more of the participants in a dialogue may have to document contextual elements themselves. These approaches will generally have minimal efficiency gains. Additionally, such approaches may have limited flexibility. For example, such approaches generally must be built for individual specialties, and are typically built for specialties in which the dialogue that occurs is routinely repeated. As these approaches generally do not use parsing to extract relevant contextual information, the performance of such approaches at generating documentation may only be applicable for those limited settings in which certain key words or phrases are routinely repeated. Furthermore, given such shortcomings, such approaches can struggle to accurately predict and thereby suggest correct modifications to profile data elements of one of the participants of the dialogue. In addition, such approaches are generally not flexible enough to enable the person, e.g., the interviewer, to personally determine in advance how comprehensive they want the auto-generated documentation outputs to be.

Clinical care is increasingly making use of electronic medical records (EMR). Roughly, clinicians spend up to 50% of their time manually entering information from patient interviews into clinical documentation in an EMR user interface. This reliance on slow, laborious, and inconsistent human data entry into EMRs has generally meant, from a computational perspective, that there is wide variability in the quality of EMR data. Data analytics generally struggle to perform well with EMR data of such variable quality.

Machine learning techniques can be used for disease and mortality prediction from EMR data. Such techniques can provide an opportunity for a significant portion of clinical data entry to be automated by analyzing patient-clinician dialogues. However, while potentially able to generate commonly used templates, such approaches do not generally incorporate new information from patient encounters.

Further, machine learning techniques can be used for prediction from electronic records data. Such techniques can provide an opportunity for a significant portion of data entry to be automated by analyzing dialogues. However, while potentially able to generate commonly used templates, such approaches do not generally incorporate new information from the encounters.

In embodiments of the present disclosure, a machine learning model is used to accurately classify dialogue phrases in a patient-clinician dialogue(s), as contextually pertinent to clinical documentation, to generate EMR data. Advantageously, the present embodiments can automatically extract pertinent information from patient-clinician dialogues for automatic generation of EMR data. Medically relevant entities are automatically extracted; for example, signs, symptoms, anatomical locations, medications, diagnoses, therapies, and referrals through natural language processing. Advantageously, unlike other approaches that primarily use lexicon-based term matching, the present embodiments use linguistic context and time information to extract entities and determine which entities are relevant. For example, a patient may mention a medication which they have not taken nor been prescribed but, without context, other systems may incorrectly record it as current medication. The present embodiments can use linguistic context to avoid such errors.

In some embodiments of the present disclosure, a machine learning model can be used to accurately classify dialogue phrases in a dialogue in other situations and environments, as contextually pertinent to documentation, to generate electronic records data. Advantageously, the present embodiments can automatically extract pertinent information from dialogues for automatic generation of electronic records data. Relevant entities are automatically extracted, and referrals are determined through natural language processing. Advantageously, unlike other approaches that primarily use lexicon-based term matching, the present embodiments can use linguistic context and time information to extract entities and determine which entities are relevant.

FIG. 1 illustrates a schematic diagram of a system 200 of extracting information from a dialogue, according to an embodiment. As shown, the system 200 has a number of physical and logical components, including a central processing unit ("CPU") 260, random access memory ("RAM") 264, an interface module 268, a network module 276, non-volatile storage 280, and a local bus 284 enabling CPU 260 to communicate with the other components. CPU 260 can include one or more processors. RAM 264 provides relatively responsive volatile storage to CPU 260. In some cases, the system 200 can be in communication with a device, for example a wearable device such as a smartwatch, via, for example, the interface module 268. The interface module 268 enables input to be provided; for example, directly via a user input device, or indirectly, for example via a recording device 150. The interface module 268 also enables output to be provided; for example, directly via a user display, or indirectly, for example via a display on the recording device 150. The network module 276 permits communication with other systems or computing devices; for example, over a local area network or over the Internet. Non-volatile storage 280 can store an operating system and programs, including computer-executable instructions for implementing the methods described herein, as well as any derivative or related data. In some cases, this data can be stored in a database 288. During operation of the system 200, the operating system, the programs and the data may be retrieved from the non-volatile storage 280 and placed in RAM 264 to facilitate execution. In other embodiments, any operating system, programs, or instructions can be executed in hardware, specialized microprocessors, logic arrays, or the like.

In an embodiment, the CPU 260 can be configured to execute a data acquisition module 202, a preprocessing module 204, an utterance module 206, an identifier module 208, an attribute module 210, a dialogue module 212, and an output module 214. In some cases, the interface module 268 and/or the network module 276 can be also executed on the CPU 260. In further cases, functions of the above modules can be combined or executed on other modules. In some cases, functions of the above modules can be executed on remote computing devices, such as centralized servers and cloud computing resources communicating over the network module 276.

Figure 2:
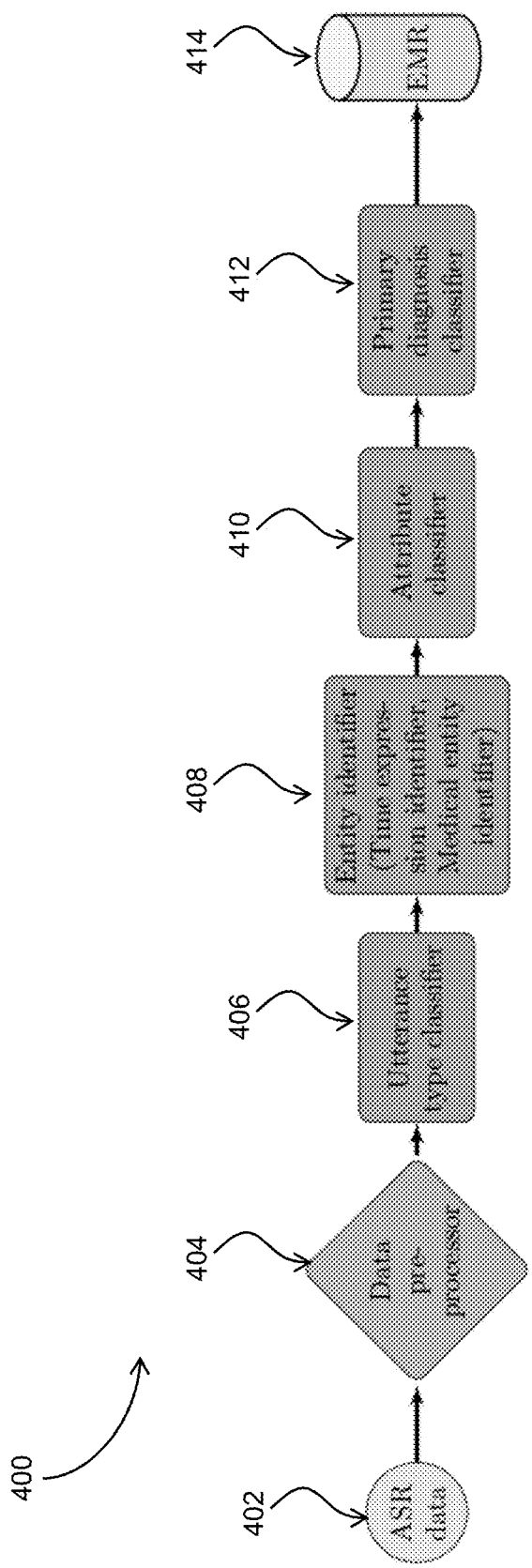
FIG. 2 shows a flowchart for a method of extracting information from a dialogue, in accordance with an embodiment.

FIG. 2 illustrates a flowchart for a method 400 of extracting information from a dialogue, according to an embodiment. At block 402, the data acquisition module 202 receives automatic speech recognition (ASR) data comprising utterances. The automatic speech recognition data comprises textual transcript of the dialogue between the patient and clinician. In further cases, the data acquisition module 202 receives a transcript of a dialogue (for example, in a text format). This transcript can be a textual dialogue between two entities, such as a typed (or chat) dialogue between two entities or a dictation between a person and a computing device. Alternatively, the data acquisition module 202 can receive a work product in a text format; for example, a report, a memorandum, or other document.

At block 404, the preprocessing module 204 preprocesses the textual transcript; for example, the text of the dialogue is lower-cased and punctuation is tokenized with the Natural Language Toolkit (NLTK). In further cases, the preprocessing module 204 can, for example, analyze the linguistic structure of the words or sentences, such as stemming, lemmatization, part-of-speech tagging, or dependency parsing. In further cases, the preprocessing module 204 can, for example, tokenize and remove stop-words and/or most-frequent-words, such as 'this', 'of', 'hello', and the like.

The recorded dialogue (also referred to as 'speech data' or 'audio') from the patient-clinician dialogues can be collected using a microphone as the recording device 150, and sent to an automatic speech recognition (ASR) module. In some cases, the ASR module can be part of the interface module 268. In other cases, the audio can be communicated to a stateless automatic speech recognition (ASR) on another computing device (for example, to a server over web-socket connection protocol) over the network module 276; in which case the network module 276 will receive the ASR text transcription of the dialogue after processing by the other computing device. In an example, the ASR module can use an audio to text transcriber model that is trained using an English transcription dataset (for example, on the Fisher-English corpus). The audio to text transcriber model architecture can use, for example, TDNN (Time Delay Neural Network) and BLSTM (bi-LSTM) techniques.

Figure 3:
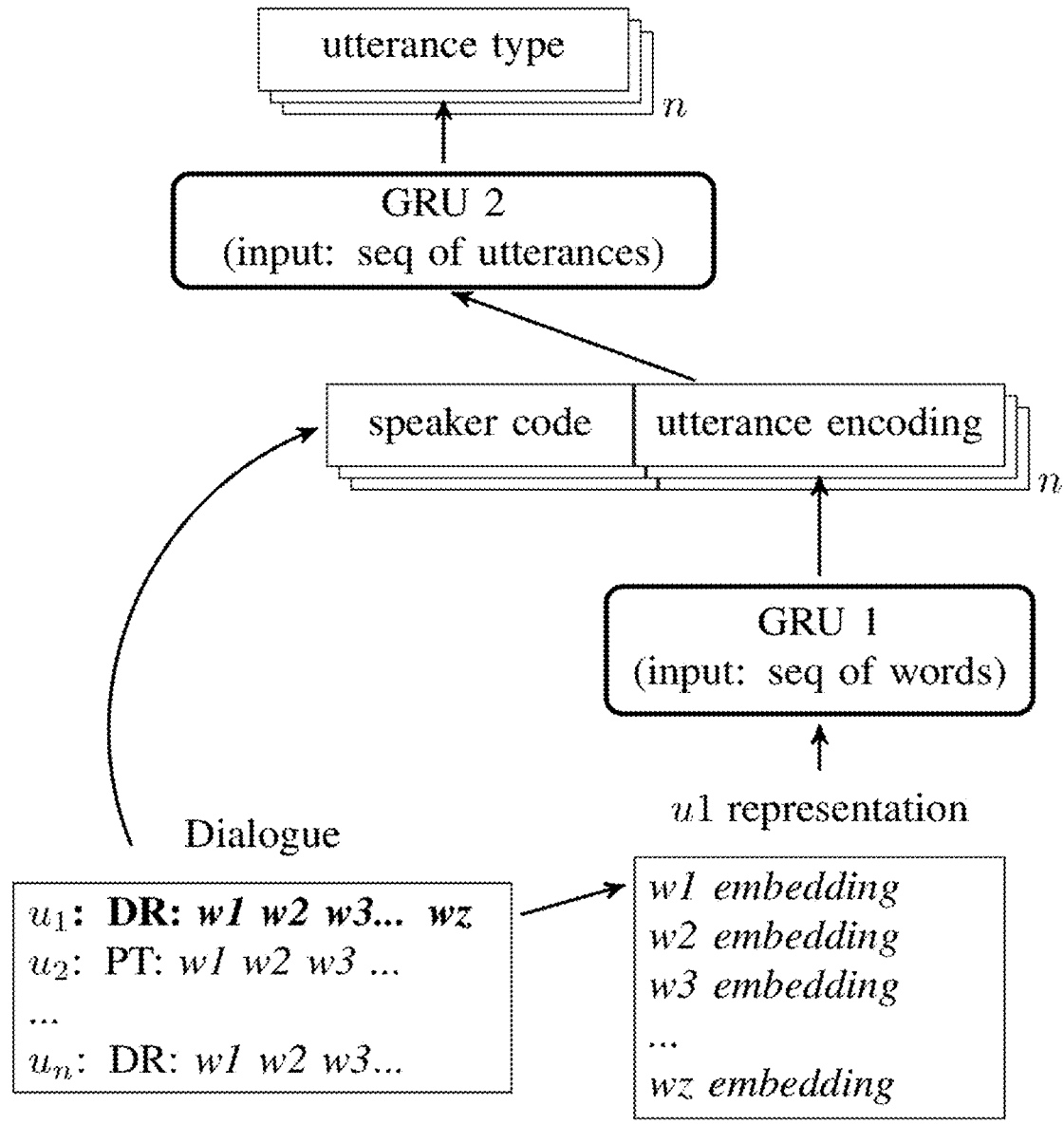
FIG. 3 shows a diagram for an example of an utterance-type classification model, in accordance with the system of FIG. 1.
Figure 4:
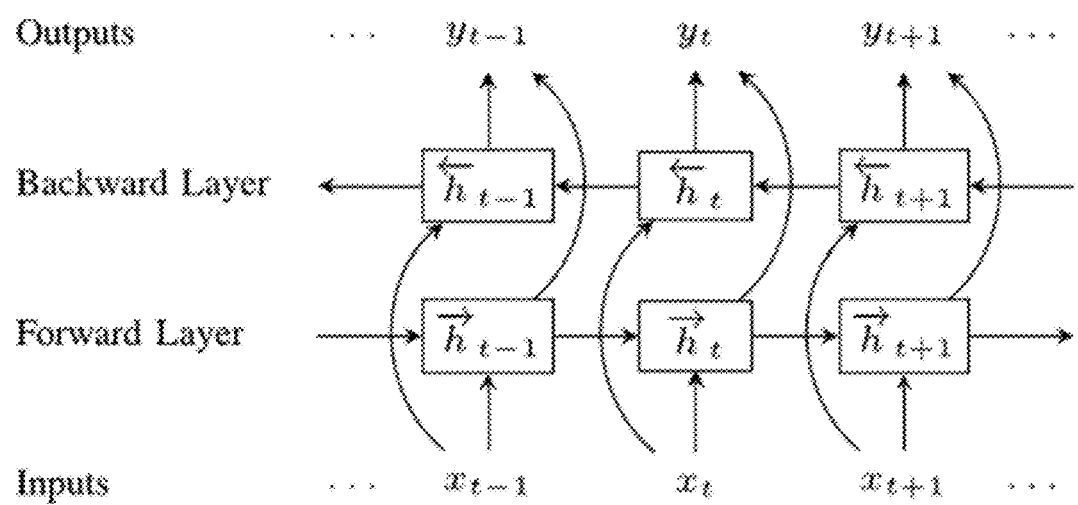
FIG. 4 shows a diagram of an example of a gated recurrent unit (GRU) layer, in accordance with the system of FIG. 1.

The system 200 applies local classification models on a word level and an utterance level, in order to extract useful information for downstream tasks. At block 406, the utterance module 206 applies an utterance-type classifier. Each utterance in the dialogue is automatically labeled; for example, as either a question, statement, positive answer, negative answer, backchannel or excluded. In a particular case, a two-layer bidirectional gated recurrent unit (GRU) neural network can be used to classify the utterances. In this case, each word/utterance can be represented as a multi-dimensional (for example, 200-dimensional) vector using a word embedding model (for example, the Wikipedia-PubMed word embedding model). The first layer of the GRU network can treat each utterance as a sequence of words, and can output a fixed-length feature vector. The second layer can treat each conversation as a sequence of these utterance feature vectors, and can produce a label for each utterance. FIG. 3 illustrates a diagram for an example of an utterance-type classification model. In this illustrated example, $u_i$ is utterance i, where i ranges from 1 to n, wy are the words, where y ranges from 1 to z, and z varies between utterances. FIG. 4 illustrates a diagram of an example of the GRU layer. The GRU neural network can be trained using one or more suitable corpora of historical data comprising previous patient-clinician dialogues. In some cases, to have a united annotation scheme, the historical data in the corpora can be mapped to the set of labels; for example, question, statement, positive answer, negative answer, backchannel or excluded.

In further embodiments, other suitable machine learning models can be used for utterance classification; for example, a Long Short Term Memory (LSTM) neural network.

At block 408, the identifier module 208 identifies entities, such as a time expression identifier and a medical entity identifier. For the time expression identification, phrases in the dialogue that reference absolute and relative times and dates are automatically tagged and converted to standardized values using a temporal tagger, for example, HeidelTime. HeidelTime is a rule-based tagger that recognizes time expressions and classifies them by type (time, date, duration, set, frequency) using regular expressions. For example, in a document dated Jan. 1, 2018, the phrase tomorrow would be normalized to 2018-01-02.

For medical entity identification, the identifier module 208 identifies a number of medical concepts; for example, anatomical locations, signs and symptoms, diagnoses, medications, referrals, investigations and therapies, and reasons for visit. The identification is automatically performed using lexicon lookup; for example, using a combined list of terms from BioPortal, Consumer Health Vocabulary (CHV), SNOMED-CT, and RxNorm. In some cases, the lexicon includes a list of clinician-curated terms. In some cases, to limit computing resource consumption, the lexicon search can have a character limit; for example, words having at least 3 characters. In an example, for each entry in the lexicon for each type of entity, lexicon lookup comprises receiving an utterance text and searching for that particular term. If the term is found and is not part of a previously tagged segment, that span of text is labeled as that particular type. In most cases, the matching is performed ignoring case.

In further embodiments, other concepts can be identified depending on the context of the dialogue. In an example, the dialogue can be between a car mechanic and a customer regarding the state of the customer's car. In this example, the identifier module 208 can identify a number of concepts related to automobiles; for example, using a list of terms related to automobiles.

In some cases, the identifier module 208 can classify each identified entity into an appropriate SOAP section of the clinical note, one of: subjective (S), objective (O), assessment (A), or plan (P) using, for example, the attribute classifier described herein. This classification can then used to generate the clinical note.

At block 410, the attribute module 210 performs attribute classification. Once the relevant entities have been identified, the attribute module 210 determines which entities are actually pertinent to the dialogue; for example, which are pertinent to a diagnosis or to a topic of conversation. For example, a physician or patient might mention a medication that they have never actually taken, so the system should not record that medication as part of the patient's history. TABLE 1 below illustrates an example of a dialogue where a medication could incorrectly be listed as a current medication, or negative, when in fact it is a past medication. In this case, the dialogue context and time phrases are crucial for properly contextualizing the medication.

TABLE 1

DR: Are you currently taking [Adderall]$_{Medication}$?
PT: No, but I took it [a few years ago]$_{TIMEX3}$.
DR: And when was that?
PT: Um, around [2015 to 2016]$_{TIMEX3}$.
DR: And did you ever take [Ritalin]$_{Medication}$?
PT: I don't think so.
Example output of other approaches:
Adderall, Ritalin
Example output of present embodiments:
Medications: Adderall (2015-2016), no Ritalin In some cases, the identifier module 208 identifies time and date expressions in the utterance text. In some cases, the identifier module 208 identifies phrases that describe quantities, for example, medication dosages or frequencies, and quality terms, such as symptom severity descriptions. In some cases, the identifier module 208 can identify which phrases pertain to which previously identifies entities.

In a particular case, the attribute module 210 can perform the attribute classification with an attribute machine learning model; for example, a support vector machine (SVM) trained with stochastic gradient descent. In a particular case, the training data for the attribute classifier can include previous dialogues with human annotations as the labels; in an example, 500 annotated conversations were used by the present inventors to train the attribute classifier. Each annotation span can be represented as an average word embedding, concatenated with the word embeddings for the previous and next 5 words. In some cases, a speaker code of the utterance in which the entity appears can be included. In this case, two attributes can be classified: modality and pertinence. The modality indicates whether the event actually occurred (for example, actual, negative, possible), and pertinence indicates the condition to which the entity is medically relevant (for example, ADHD, COPD, depression, influenza, and the like). Pertinence includes dialogue-level features, for example, those related to word frequencies (for example, term frequency-inverse document frequency (tf-idf)).

At block 412, the dialogue module 212 applies one or more dialogue machine learning models, for example, for diagnosis classification and topic modeling. For diagnosis classification, the dialogue module 212 classifies a primary diagnosis on each patient-clinician dialogue using a diagnoses machine learning model. In a particular case, the training data for the diagnosis classifier can include previous dialogues with human diagnosis annotations as the labels; in an example, 800 annotated conversations were used by the present inventors to train the diagnosis classifier. The primary diagnosis classification can be used to automatically identify a main diagnosis for billing codes. In some cases, tf-idf can be applied on cleaned text of each patient-clinician dialogue (also referred to as a dyad). Diagnosis classification can use one or more machine learning models as the classifier; for example, logistic regression, support-vector-machines (SVMs), and random forest models. In some cases, cross-validation can be used to validate the models, for example, 5-fold cross validation. An $F_1$ score can be determined for the classification results based on, for example, manually-assigned primary diagnosis labels associated with the transcription of the dialogues. In some cases, medical entities extracted by previously-trained models (for example, symptoms, medications, times, and the like) and their predicted attributes, can be used in a diagnosis classification model to ignore parts of the dialogue that are irrelevant to the clinician; such as those that are not concerned with diagnosis or medication.

The dialogue module 212 can use topic modeling using a topic machine learning model; for example, by performing unsupervised machine learning to form k number of topics (clusters of words) occurring together, where k can be chosen empirically. In an example, topic modeling can be performed using an open-source gensim package on dyads using k=5, 10, 12, 15, 20, 25, 30, and 40. In most cases, due to the colloquial nature of many patient-clinician conversations, the transcriptions can contain many informal words and non-medical conversations. In some cases, common words can be removed; for example, stop words from NLTK, backchannel, and words with frequencies above a certain threshold (for example, above 0.05% of the total number words in all the transcriptions to reduce the influence of more generic words).

In some cases, topic modelling can use an unsupervised model for extracting latent topics of the dialogues. In an example, a Latent Dirichlet Allocation (LDA) model can be used to extract useful topical information. For example, applying LDA on structured EMR data such as age, gender, and lab results, can be used to show that the relevance of topics obtained for each medical diagnosis aligns with the co-occurring conditions. Topic modelling on EMR data can also be used to provide, for example, an empirical analysis of data for correlating disease topics with genetic mutations. In this way, topic modelling can be useful for extracting important information and identifying a dominant topic of the dialogue. In some cases, the system 200 can use topic modelling, for example, to keep track of the focus of each visit, the distribution of word usage, categorization, and to group patients together using similarity measures. In some cases, the system 200 can also use topic modelling for relevant utterance extraction; i.e., extracting the utterances that are related to the primary diagnosis leaving out the non-medical discussion during the dialogue. The topic machine learning model can be trained on previous clinician patient utterances with human annotations.

In some cases, topic modelling can use functions provided by an open-source gensim package. The number of topics (i.e., k) is generally chosen before applying the model. The value of k can be different depending on data, such as based on a 'coherence measure' and qualitatively analysis of the topics. For example, output of the topic modelling is k number of topics; i.e., k number of sets of words, which have a high probability of appearing in that topic. In an example, the following three topics were extracted, along with their associated words, from an experimental patient-clinician dialogue;

| Topic# | Topic words |
| --- | --- |
| 0 | focus, sleeping, depressed, asleep, attention, mind, cymbalta, appetite, psychiatrist, energy. |
| 1 | ache, h1n1, treat, asthma, temperature, diarrhea, anybody, mucinex, chill, allergic. |

| Topic# | Topic words |
|---|---|
| 2 | period, knee, birth, heavy, ultrasound, iron, metoprolol, pregnancy, pregnant, history. |

At block 414, the output module 214 can output EMR data comprising at least one of the utterance classifications, entity identifications, attribute classifications, diagnosis classification. and topic modeling. In some cases, the extracted entities and attributes can be saved as an XML data file.

In some cases, the output module 214 can take the output of the previous models and generates a natural language clinical note containing the SOAP sections, described herein, as part of the outputted EMR data. In some cases, the output module 214 can generate a text summary of the visit that can be given to a patient using a text generation model; such model can learn templates of clinical notes from examples of clinical notes written by physicians. The text generation model can be used to combine the template with specific structured information extracted from the conversation. In some cases, the generated note can include not only the entity itself, but also any relevant contextual or temporal information. For example, if a medication is mentioned, the note can include the medication name along with the dosage information and when the patient took that medication (or if it is newly prescribed). In some cases, the contextual information can be derived from previous models in the pipeline; for example, the outputs from temporal and entity tagging models can be fed directly into text generation model.

The natural language clinical note can use a neural text generation model that, in some cases, uses a neural encoder-decoder model with copy and coverage mechanisms to learn templates and insert structured data. The input to this model can be a set of structured data, such as medical entities identified by previous modules in the pipeline. The first layer of the text generation model (called a content planning network) generates a content plan, which is a selection and ordering of information from the input dataset. These reordered entities are then passed to the second layer of the model, which uses the content plan along with the input data to generate a sequence of words, resulting in a text document. The neural network encoder reads in the content plan, and the decoder uses a recurrent neural network to predict the next word in the sequence given the sequence so far. The words can either be generated from a learned vocabulary, such as from a language model trained on a large corpus of in-domain text, or can be copied directly from the input data using a copy mechanism. For example, a medication name mentioned in the conversation should be copied directly into the output note. The model uses a probability score to determine whether the next word should be generated from the vocabulary or copied from the input data. This allows the neural encoder-decoder model to retain the correct information from the input during generation The present embodiments provide several substantial improvements to the text generation model, for example:
Correctly representing contextual information associated with the extracted entities, such as severity, modality (actual, possible, negative, future, etc.), and time information.
Automatically adjusting the template based on the predicted diagnosis of the patient. For example, if the discussion is about diabetes, the generated note template will be structured specifically for a diabetes patient, and include relevant sections and metrics as mentioned in the conversation (such as "a1c").
Personalization of the generated clinical notes based on individual physicians. Given training data from a particular physician, the model can adjust the generated note to more closely resemble the style of the target physician. The text generation model is evaluated by computing the similarity to physician-generated notes from the same conversation transcripts.

In some cases, as part of the outputted EMR data, the output module 214 can identify relevant actions that a physician may want to take within the EMR system. For example, if a new prescription was mentioned in the conversation, the output module 214 can pre-populate a prescription form with the information extracted from the conversation, which the physician can then review and approve. Once the identifier module has extracted medication names and dosages, the output module 214 can pre-populate the relevant fields in a EMR prescription form, based on the entity tags (i.e. "medication", "quantity", and the like).

In an example of the system 200, a cloud-based implementation can be used; whereby the interface module 268 and recording device 150 (microphone hardware) can be located on the clinician's local computing device, including an EMR application programming interface (API). The other aspects of the system can be at least partially undertaken on a centralized cloud computing server. With the API, the clinician inputs a location and documentation of different kinds of EMR fields with a specific EMR action type. In this way, local EMR actions can be mapped to a set of generic EMR actions. The EMR fields and actions can be used so that suggested outputs can be enacted within the EMR.

In this example, as the dialogue is occurring, the recording device 150 is recording the dialogue and a real-time visualization of a transcription of the dialogue can be viewable on the interface module 268. In some cases, this transcribed dialogue can be forwarded to a cloud-based computing system, and the models can be applied to this transcribed dialogue in real time. In this way, with each additional clinically pertinent word/phrase that is extracted, the relations between the various model features within the transcribed dialogue data and the corresponding model outputs are updated in real-time. In some cases, the clinician can start and stop the system 200 functionalities as desired. Once the clinician wants to commence EMR, the system 200 has already generated a list of suggested EMR documentations and actions based on analysis of the clinical dialogue. The output can comprise predicted clinical codes, predicted billing codes, predicted modifications to a cumulative patient profile (CPP), and predicted EMR actions. All predicted outputs represent high quality coded data in the technical format for the specific data elements in the database system used by each EMR, and rooted, for example, in the Health Level 7 data transfer standard (HL7, including FHIR) that is used in healthcare.

In this example, the clinician's edits can also include removal edits. The user interface can display the transcribed word/phrase associated with the removed edit, and each word/phrase's associated contextual linguistic entities, the selected standardized nomenclature, and their clinical significance level. In some cases, the clinician can identify the error with that word/phrase. Such errors can include one or more of: 1) the transcribed word/phrase associated with the removed documentation was never verbalized, which presumes ASR failure; 2) the verbalized word/phrase was correctly transcribed, and that this dialogue feature is not clinical pertinent; 3) the verbalized word/phrase was correctly transcribed, and that this dialogue feature is clinically pertinent, but its associated contextual information is incorrect; 4) the verbalized word/phrase was correctly transcribed, and that this dialogue feature is clinically pertinent, but is not significant enough for documentation at the selected significance level for note comprehensiveness; and 5) the verbalized word/phrase was correctly transcribed, and that this dialogue feature is clinically pertinent, and significant enough for documentation, but that the transformation of that speech feature into standardized clinical nomenclature is incorrect.

Once editing is complete, the clinician-edited documentation can be inserted into the correct EMR fields. In this way, advantageously, individual clinicians can be given editing control of the output of the system 200. In some cases, the models of the system 200 can use the clinician's edits described above for further training of the models. In this way, after several iterations of use, most clinical cases and their associated assessments will require minimal or no editing at all. In some cases, this editing can be combined with editing of other clinicians to collectively train the models for even greater improvement.

Figure 5:
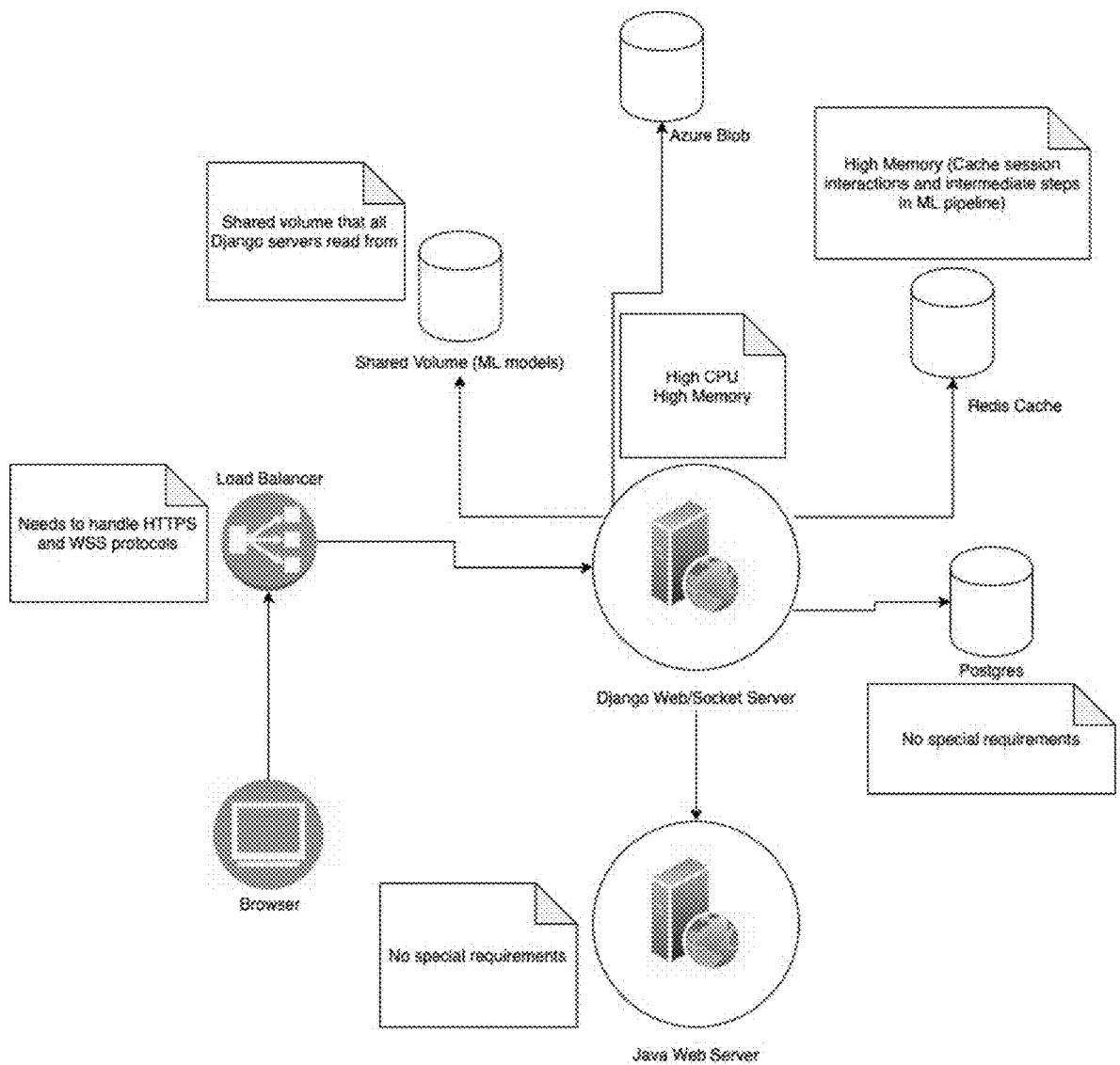
FIG. 5 shows an architecture of an example of the system of FIG. 1.

Turning to FIG. 5, shown is an example of an architecture for the system 200. This architecture provides a specific exemplary implementation based on available computing resources; however, alternative implementations can be used as appropriate.

Figure 6:
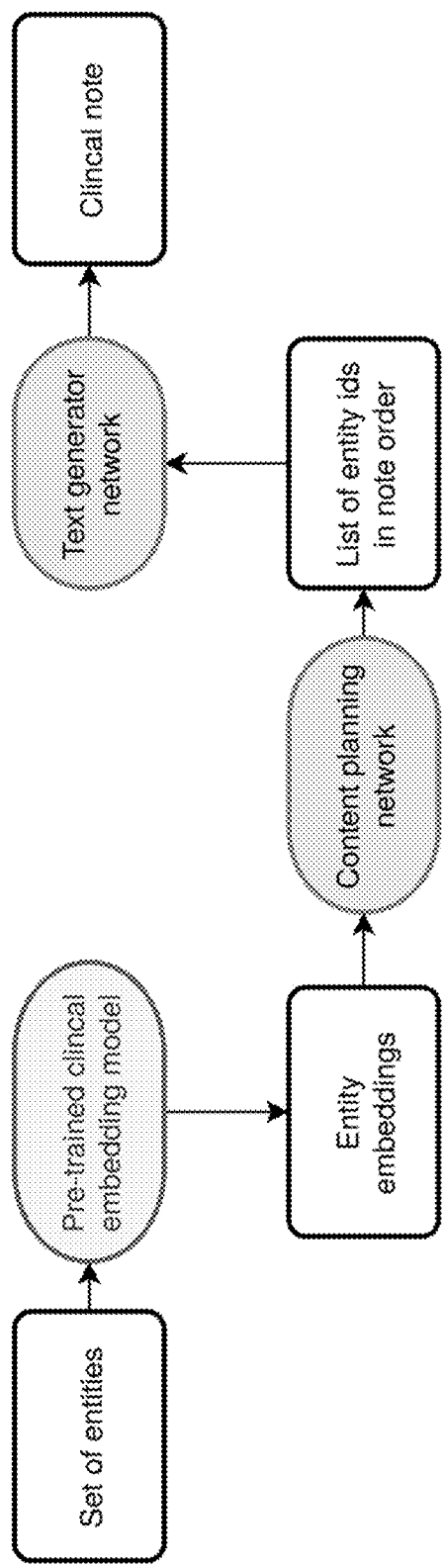
FIG. 6 shows an example flow chart for generating a clinical note in accordance with the method of FIG. 2.

Turning to FIG. 6, shown is an example of generating a clinical note, using the entities identified by the identifier module 208. The set of entities get passed through a clinical embedding model, as described herein, and converted to entity embeddings. The entity embeddings get passed though the text generation network, as described above, to generate a content plan, which determines the order the entities will appear in the output note. The list of entity ids and their associated order from the content plan are passed through a text generator network to generate the clinical note.

Figure 7:
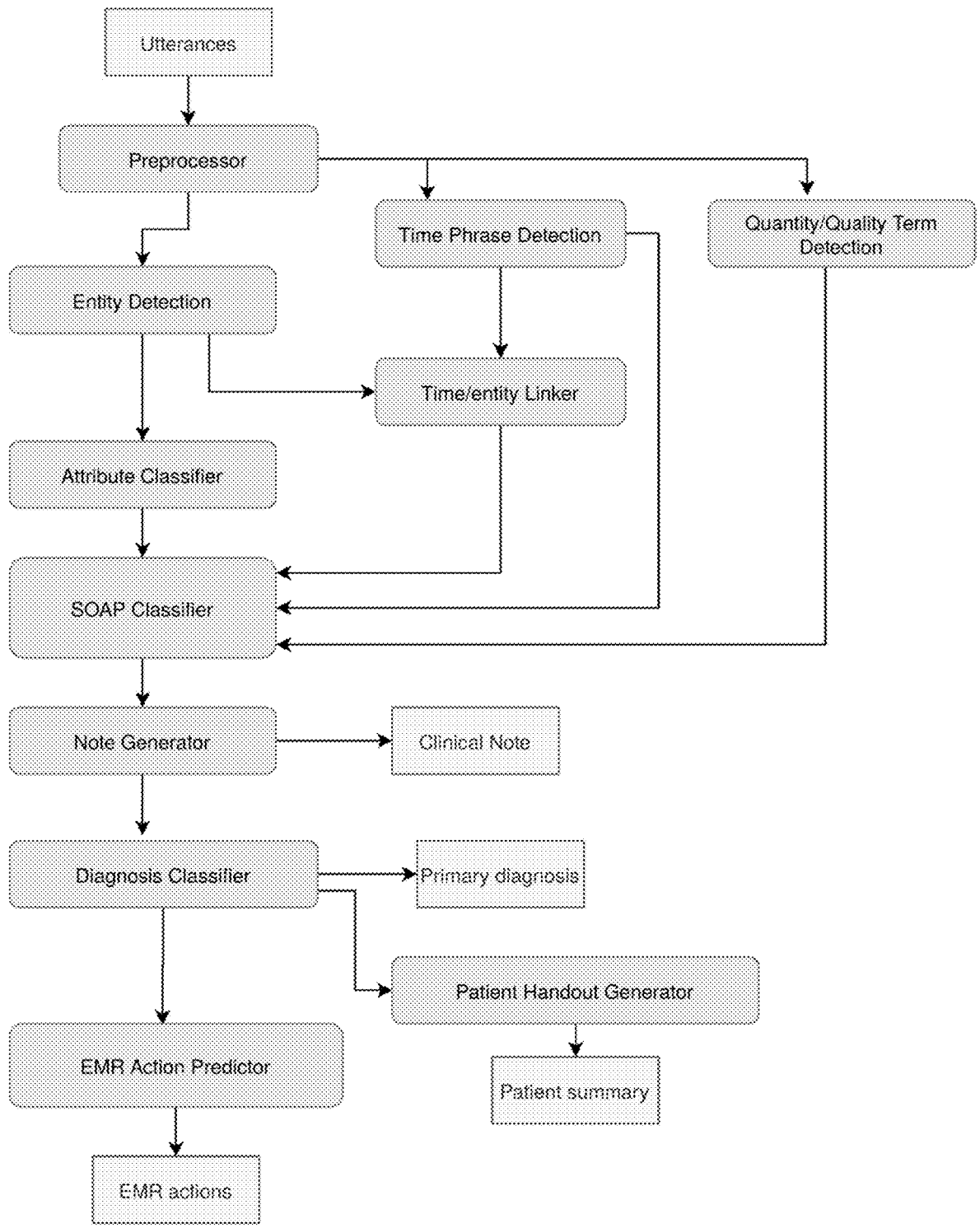
FIG. 7 shows a pipeline flow chart in accordance with the method of FIG. 2.

FIG. 7 shows an example pipeline for implementing the method 400 in order to generate a clinical note, a primary diagnosis, a list of EMR actions, and a patient summary in the form of a patient handout. The patient summary can be generated by a model using a same or similar architecture as the text generation network used for generating the clinical note, but trained on human-authored patient summaries.

Figure 8:
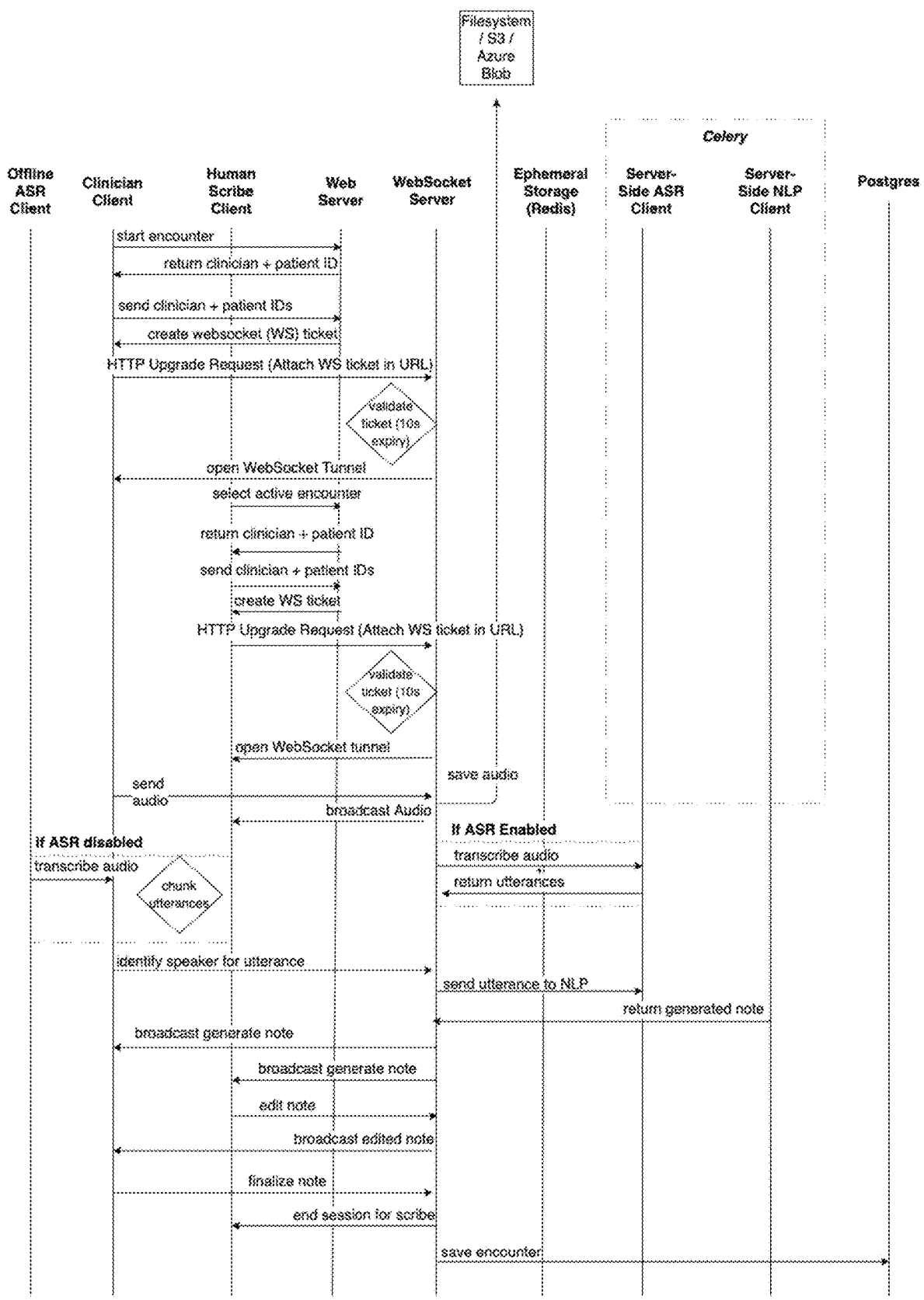
FIG. 8 shows a flow diagram of a socket server in accordance with the architecture of FIG. 5.

FIG. 8 shows an example of a flow diagram for the socket server provided in the architecture of FIG. 5. In this example, there is a clinician client which is a portal in which a clinician can start a new encounter, showing live updates and live transcriptions from the output module 214 (in this example, represented by the ASR client and NLP client), and live updates from a human scribe client, as described below. The clinician client can be used to facilitate the clinician and patient encounter. The human scribe client is a portal in which a human scribe can listen to an encounter to which they are given access. Through this portal, they can receive live updates and live transcriptions from the output module 214. A user of the human scribe client can use the portal to make edits to the generated output from the output module 214 so that the generated note is more accurate. In this example, there is also a WebSocket server to manages encounters; allowing the clinician client, human scribe client, the ASR client, and the NLP client to communicate with each other. The WebSocket server includes a WebSocket ticketing system to ensure only authorized users can send and receive message from the WebSocket. The WebSocket server also implements access control (manages what a clinician client and human scribe client is allowed to do at different points in time). The WebSocket server provides the infrastructure needed for encounters in a scalable and secure. In this example, there is also an offline ASR client. The offline ASR client can use the utterance module 206 to transcribe live audio to utterances without internet access. This is useful to provide a live transcript of the conversation to the clinician client and human scribe client in deployments where the system 200 does not have internet access. The utterances returned from the ASR client will also be used as input into the other modules, represented by an NLP client. The NLP client generates a clinician's note based on utterances using an identifier module 208, an attribute module 210, a dialogue module 212, and an output module 214, as described herein.

The present inventors conducted example experiments to demonstrate and evaluate the effectiveness of the present embodiments using several qualitative and quantitative metrics. The dataset used for the example experiments consisted of 800 audio patient-clinician dialogues (dyads) and their transcripts. Each dialogue also included patient demographics along with the primary diagnosis. The distribution of diagnoses is shown in TABLE 2.

TABLE 2

| Primary diagnosis | Dyads |
| --- | --- |
| ADHD | 100 |
| Depression | 100 |
| COPD | 101 |
| Influenza | 100 |
| Osteoporosis | 87 |
| Type II Diabetes | 86 |
| Other | 226 |

Each dialogue transcript in the dataset was annotated by clinicians. The annotation was used to evaluate the present embodiments. In order to save time for the annotators, time phrases and a limited set of entities were automatically annotated. The clinicians were given the opportunity to correct these annotations.

Since there was no ground truth yet for utterance types in the dataset, two external datasets were used for training: the Switchboard corpus and the AMI corpus. Since the two corpora have different annotation schemes, the two sets of dialAct (dialogue act) labels were mapped to the set of six labels used by the present embodiments; mapping all information request categories to question, answer categories to positive/negative answer, and the like. The diagnosis models were trained and tested on a 5-fold cross validation of the 800 dyads. The utterance classifier was tested on 20 conversations that were manually annotated with utterance types.

Each component of the system was evaluated using precision (P), recall (R), and $F_1$ measures. For entity tagging, inter-annotator agreement was determined between the physicians and the present embodiments using Krippendorff's alpha. The utterance type classifier was evaluated on 20 conversations, annotated independently by 2 annotators with inter-annotator agreement of 0.77 (Cohen's kappa). TABLE 3 illustrates utterance type classification results, trained on switchboard and AMI data (backchannel: short affirmation of listening, excluded: utterances that are cut off or otherwise do not fit into one of the other categories).

TABLE 3

| Class | Utterances | P | R | $F_1$ |
|---|---|---|---|---|
| Question | 539 | 0.72 | 0.49 | 0.59 |
| Statement | 2,347 | 0.82 | 0.83 | 0.82 |
| AnswerPositive | 195 | 0.36 | 0.41 | 0.38 |
| AnswerNegative | 82 | 0.74 | 0.34 | 0.47 |
| Backchannel | 494 | 0.56 | 0.76 | 0.64 |
| Excluded | 131 | 0.20 | 0.16 | 0.18 |
| Average | 3,788 | 0.72 | 0.72 | 0.71 |

The automated entity tagging considered spans that overlapped with the human annotations as correct because the exact text spans of annotations can vary between annotators. TABLE 4 shows the results by type of entity, evaluated on 302 conversations.

TABLE 4

| Class | Entities | P | R | $F_1$ | α |
|---|---|---|---|---|---|
| time phrase | 6,570 | 0.94 | 0.70 | 0.81 | 0.81 |
| sign_symptom | 4,621 | 0.77 | 0.38 | 0.51 | 0.20 |
| medication | 3,734 | 0.52 | 0.82 | 0.64 | 0.62 |
| diagnosis | 1,753 | 0.77 | 0.66 | 0.71 | 0.62 |
| anatomical locations | 1,539 | 0.56 | 0.36 | 0.44 | 0.41 |
| investigation/therapy | 981 | 0.38 | 0.23 | 0.29 | 0.32 |
| referral | 226 | 0.21 | 0.08 | 0.12 | 0.24 |
| Average | 19,424 | 0.74 | 0.59 | 0.63 | 0.55 |

For attribute classification, the model was trained on 252 annotated conversations, and tested on 50 conversations. TABLE 5 shows the results of modality classification and TABLE 6 shows the results of pertinence classification.

TABLE 5

| Class | Entities | P | R | $F_1$ |
|---|---|---|---|---|
| Actual | 504 | 0.87 | 0.80 | 0.83 |
| Negative | 144 | 0.63 | 0.64 | 0.64 |
| Possible | 5 | 0.09 | 0.40 | 0.14 |
| None | 91 | 0.59 | 0.71 | 0.65 |
| Average | 744 | 0.78 | 0.76 | 0.77 |

TABLE 6

| Class | Entities | P | R | $F_1$ |
|---|---|---|---|---|
| ADHD | 126 | 0.54 | 0.41 | 0.28 |
| COPD | 22 | 0.20 | 0.45 | 0.28 |
| Depression | 32 | 0.27 | 0.81 | 0.41 |
| Influenza | 246 | 0.72 | 0.83 | 0.77 |
| Other | 312 | 0.79 | 0.51 | 0.62 |
| None | 6 | 0.32 | 1.00 | 0.48 |
| Average | 744 | 0.68 | 0.61 | 0.62 |

In TABLE 7, the results of the primary diagnosis classification (Linear SVM) are presented. The scores were averaged across 5-fold cross-validation (Train: 80%, Test: 20%).

TABLE 7

| Class | P | R | $F_1$ |
|---|---|---|---|
| ADHD | 0.84 | 0.84 | 0.83 ± 0.05 |
| Depression | 0.80 | 0.64 | 0.71 ± 0.08 |
| Osteoporosis | 0.81 | 0.78 | 0.78 ± 0.04 |
| Influenza | 0.91 | 0.95 | 0.93 ± 0.04 |
| COPD | 0.75 | 0.65 | 0.68 ± 0.14 |
| Type II Diabetes | 0.81 | 0.75 | 0.76 ± 0.07 |
| other | 0.71 | 0.82 | 0.76 ± 0.05 |
| Average | 0.79 | 0.78 | 0.78 ± 0.04 |

The topic modeling results for k=12 topics are shown in TABLE 8, showing the top 10 words for 7 of 12 topics. The words in each topic are reported in the decreasing order of importance. A manual analysis shows that topic 0 captures words related to ADHD/depression, while topic 1 is related to asthma/flu, and topic 3 is related to women's health and so on.

TABLE 8

| Topic# | Top words |
|---|---|
| 0 | focus, sleeping, depressed, asleep, attention, mind, cymbalta, appetite, psychiatrist, energy |
| 1 | ache, h1n1, treat, asthma, temperature, diarrhea, anybody, mucinex, chill, allergic |
| 2 | period, knee, birth, heavy, ultrasound, iron, metoprolol, pregnancy, pregnant, history, |
| 3 | meal, diabetic, lose, unit, mail, deal, crazy, card, swelling, pound |
| 4 | cymbalta, lantus, cool, cancer, crazy, allergy, sister, attack, nurse, wow |
| 5 | referral, trazodone, asked, shingle, woman, medicare, med, friend, clinic, form |
| 6 | breo, cream, puff, rash, smoking, albuterol, skin, allergy, proair, allergic |

A synthetic patient-clinician dialogue used in the example experiments is shown in TABLES 9A and 9B. TABLE 9A shows manual annotation and TABLE 9B shows annotation by the present embodiments on the same dialogue. TIMEX3 entities represent the time phrases extracted by HeidelTime; underline indicates the annotated entities; double underlines indicate overlap between human and automatic annotations; subscripts indicate the entity type.

TABLE 9A

DR: It's a shame how good the Blue Jays were a couple of seasons ago compared to now.
PT: Yeah, I'm still not sure we should have got rid of Alex Anthopoulos.
DR: Yeah, that was the turning point, eh? Anyways, you're here to review your [diabetes]$_{Diagnosis}$ right?
PT: That's right.
DR: How's the [numbness in your toes]$_{Sign/Symptom}$/[toes]$_{Anatomical\ Location}$?
PT: The same. I'm used to it by now, and I'm grateful it's not getting worse.
DR: Okay, that's good. Let's keep you on the [same dose of Metformin]$_{Medication}$ [for now]$_{TIMEX3}$ then we'll check your [a1c]$_{Investigation/Therapy}$ again [in three months]$_{TIMEX3}$, and then I'll [see you back here after that]$_{Disposition\ plan}$.
Patient: That makes sense to me.

TABLE 9B

DR: It's a shame how good the [Blue]$_{Medication}$ Jays were a couple of seasons ago compared to [now]$_{TIMEX3}$.

TABLE 9B-continued

PT: Yeah, I'm still not sure we should have got rid of Alex Anthopoulos.
DR: Yeah, that was the turning point, eh? Anyways, you're here to review your [diabetes]$_{Diagnosis}$ right?
PT: That's right.
DR: How's the numbness in your [toes]$_{Anatomical\ Location}$?
PT: The same. I'm used to it by [now]$_{TIMEX3}$, and I'm grateful it's not getting worse.
DR: Okay, that's good. Let's keep you on the same [dose]$_{Medication}$ of [Metformin]$_{Medication}$ for [now]$_{TIMEX3}$ then we'll check your a1c again in [three months]$_{TIMEX3}$, and then I'll see you back here after that.
Patient: That makes sense to me.

The models performed well in the context of the example experiments. For example, the primary diagnosis classifier performed substantially well, even without the availability of labeled entity features. The results for influenza achieved almost a 0.90 $F_1$ score, while the results for COPD and depression were usually around a 0.70 $F_1$ score. With respect to topic modelling, it is clear that it has potential uses for keeping track of the focus of each visit, the distribution of word usage, categorization, and to group patients together using similarity measures.

As evidenced in the example experiments, the present embodiments provide an improved approach to clinician-patient dialogue parsing, whose outputs are oriented toward pragmatic linguistic features, and the needs of clinicians. In this way, machine learning models have been developed, for example based on recurrent neural networks, that extract medical linguistic entities and their time-based contextual partners, as well as primary diagnoses from dialogue. As the results of the example experiments show, the model can output high-quality patient documentation that can be readily integrated into standard EMR data fields, amenable to data analytics tools.

TABLES 10 and 11 show further examples of patient-client dialogues as applied to the system 200.

TABLE 10

Doctor: "Are you taking Adderall?"
Patient: "I took it a few years ago."
Doctor: "When was that?"
Patient: "I think around 2010 to 2012."
Entity extracted with present embodiments:

Adderral (type: medication; attribute: prescription name; modality: past; time: 2010-2012; pertinence: ADHD)
Entity extracted with other approaches:

Adderral → With no reference to time it is assumed that the patient is currently taking Adderral)

TABLE 11

Doctor: "Do you have stuffy nose?"
Patient: "No, I did not have a stuffy nose but I have been coughing all night. And maybe a slight fever."
Entities extracted with present embodiments:

Stuffy nose (type: symptom; attribute: presenting problem (Modality: negative) pertinence: Influenza);
Coughing (type: symptom; attribute: presenting problem (Modality: Positive) pertinence: Influenza);
Fever (type: symptom; attribute: presenting problem (Modality: Possible); pertinence: Influenza)

TABLE 11-continued

Entity extracted with other approaches:

stuffy nose; coughing; fever → System will assume that the patient has all three symptoms regardless of the context)

Embodiments of the present disclosure have the intended advantages of built-in detailed foundational parsing, which links extracted clinical entities and their attributes with contextual linguistic entities. This allows for deep semantic understanding of the transcribed dialogue language that facilitates the customization of the documentation output to a clinician's preferences. Advantageously, the initially generated clinical documentation can interpret and provide accurate outputs for many more varied clinical scenarios than other approaches. Advantageously, the present embodiments are highly flexible to any clinician and their mode of operation within any clinical encounter. Advantageously, the present embodiments do not need to have the clinician verbalize specific words to trigger its parsing due to the parsing of the dialogue; in this way, the present embodiments are able to ignore verbalized words/phrases that are irrelevant to the clinical scenario.

Various embodiments are described above relating to the analysis of client-clinician dialogues, but the embodiments are not so limited. The embodiments described herein may apply to other contexts with necessary modifications.

Although the foregoing has been described with reference to certain specific embodiments, various modifications thereto will be apparent to those skilled in the art without departing from the spirit and scope of the invention as outlined in the appended claims.

The invention claimed is:

1. A computer-implemented method of extracting clinical information from textual data comprising a transcription of a patient-clinician dialogue, the method comprising:
receiving the textual data;
classifying utterances in the transcription data using a trained classification machine learning model, the classification machine learning model trained using one or more corpora of historical data comprising previous textual data labelled with utterances;
identifying entities in the transcription data;
classifying attributes in the transcription data using a trained attribute machine learning model, the attribute machine learning model trained using one or more corpora of historical data comprising previous textual data labelled with attributes;
generating a natural language clinical note, using a neural encoder-decoder model with copy and coverage mechanisms during the generating; and
outputting the natural language clinical note, the natural language clinical note comprising at least one of the utterances, the entities, and the attributes.

2. The method of claim 1, further comprising preprocessing the transcription data by one of stemming, lemmatization, part-of-speech tagging, and dependency parsing.

3. The method of claim 1, further comprising preprocessing the transcription data by tokenizing and removing stopwords and frequent-words.

4. The method of claim 1, wherein classifying the utterances comprising classifying as one of a question utterance, a statement utterance, a positive answer utterance, a negative answer utterance, a backchannel utterance, and an excluded utterance.

5. The method of claim 1, wherein the classification machine learning model comprises a two-layer bidirectional gated recurrent unit (GRU) neural network.

6. The method of claim 5, wherein each utterance can be represented as a multi-dimensional vector using a word embedding model.

7. The method of claim 6, wherein a first layer of the GRU network treats each utterance as a sequence of words and outputs a fixed-length utterance feature vector, and a second layer of the GRU network treats the dialogue as a sequence of the utterance feature vectors to generate a label for each utterance.

8. The method of claim 1, wherein identifying entities in the transcription data comprises identifying time expressions and converting the time expressions to standardized values using a temporal tagger.

9. The method of claim 1, wherein identifying entities in the transcription data comprises identifying medical concepts using comparison to a medical lexicon.

10. The method of claim 1, wherein the classified attributes comprise modality and pertinence, modality comprising an indication of whether an event associated with the attribute occurred, pertinence comprising an indication of the relevance of the attribute to a medical condition.

11. The method of claim 1, wherein identifying entities further comprises classifying each entity as one of subjective(S), objective (O), assessment (A), or plan (P).

12. The method of claim 1, further comprising classifying one or more diagnoses in the transcription data using a trained diagnoses machine learning model, and the output module further outputs the diagnoses.

13. The method of claim 12, further comprising identifying a primary diagnosis from the one or more diagnoses.

14. The method of claim 1, further comprising using topic modelling with an unsupervised model for extracting latent topics in the transcription of the dialogue.

15. A system of extracting clinical information from textual data comprising a transcription of a patient-clinician dialogue, the system comprising one or more processors in communication with a data storage, the one or more processors configured to execute:
   a data acquisition module to receive the textual data;
   an utterance module to classify utterances in the transcription data using a trained classification machine learning model, the classification machine learning model trained using one or more corpora of historical data comprising previous textual data labelled with utterances;
   an identifier module to identify entities in the transcription data;
   an attribute module to classify attributes in the transcription data using a trained attribute machine learning model, the attribute machine learning model trained using one or more corpora of historical data comprising previous textual data labelled with attributes; and
   an output module to generate a natural language clinical note using a neural encoder-decoder model with copy and coverage mechanisms, and to output the natural language clinical note, the natural language clinical note comprising at least one of the utterances, the entities, and the attributes.

16. The system of claim 15, further comprising a preprocessing module to preprocess the transcription data by one of stemming, lemmatization, part-of-speech tagging, and dependency parsing.

17. The system of claim 15, further comprising a preprocessing module to preprocess the transcription data by tokenizing and removing stop-words and frequent-words.

18. The system of claim 15, wherein classifying the utterances comprising classifying as one of a question utterance, a statement utterance, a positive answer utterance, a negative answer utterance, a backchannel utterance, and an excluded utterance.

* * * * *